United States Patent [19]

Miller

[11] 4,124,016

[45] Nov. 7, 1978

[54] OVENS FOR BAKING BREAD AND LIKE PRODUCTS

[75] Inventor: Donald A. Miller, Maribyrnong, Australia

[73] Assignee: Breadco Services Limited, London, England

[21] Appl. No.: 802,428

[22] Filed: Jun. 1, 1977

[30] Foreign Application Priority Data

Jun. 8, 1976 [GB] United Kingdom ............... 23613/76

[51] Int. Cl.² .......................................... F24C 15/32
[52] U.S. Cl. ................................................ 126/21 A
[58] Field of Search .............. 126/21 A, 273 R, 19 R, 126/21 R; 219/400; 432/176

[56] References Cited

U.S. PATENT DOCUMENTS

| 3,261,650 | 7/1966 | Stromquist | 126/21 A |
| 3,658,047 | 4/1972 | Happel | 126/21 A |
| 3,905,760 | 9/1975 | Johannsson et al. | 432/176 |

Primary Examiner—Edward G. Favors
Attorney, Agent, or Firm—Bacon & Thomas

[57] ABSTRACT

An oven for baking bread and like products includes an oven chamber which is heated by supplying heated air to the chamber through horizontal slits in opposed side walls of the oven chamber. The oven may be converted for baking articles of a different size by the pivoting of means mounted in the oven adjacent selected horizontal slits between positions in which the adjacent horizontal slits are closed and positions in which the adjacent horizontal slits are open and additional trays may be supported in the oven chamber adjacent the selected horizontal slits. A forced air convection oven is therefore adaptable for use in making good quality products of a large size such as loaves, and also good quality products of a smaller size such as rolls.

3 Claims, 9 Drawing Figures

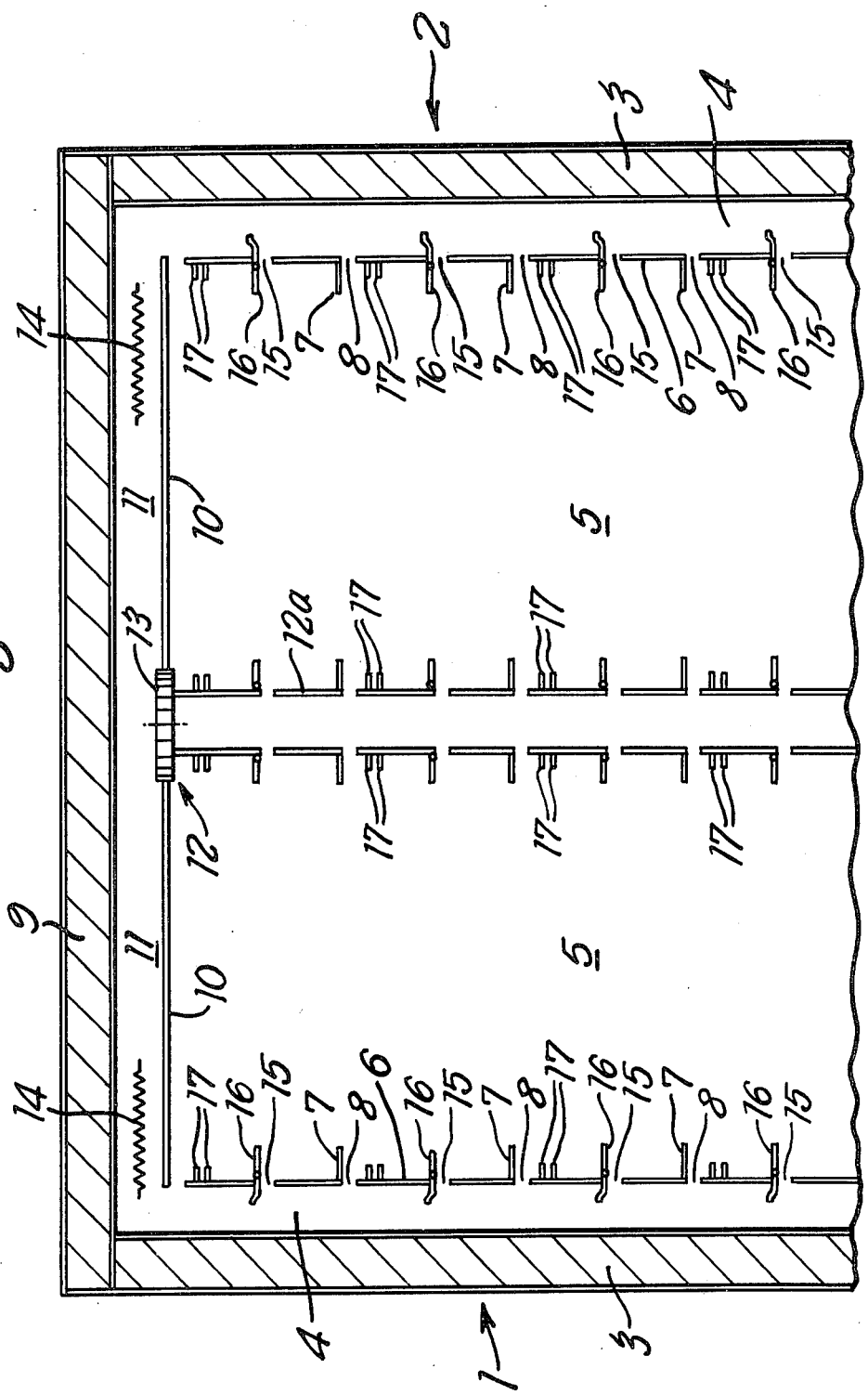

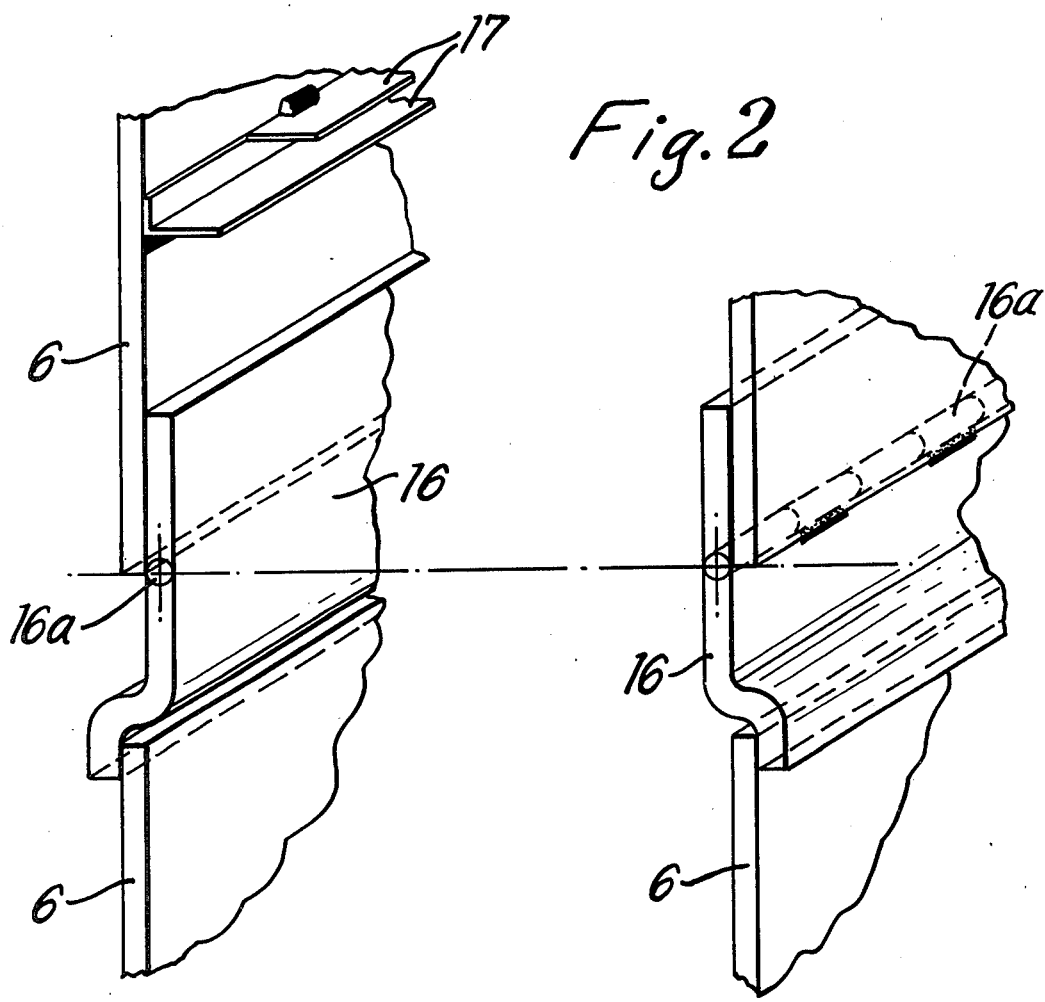

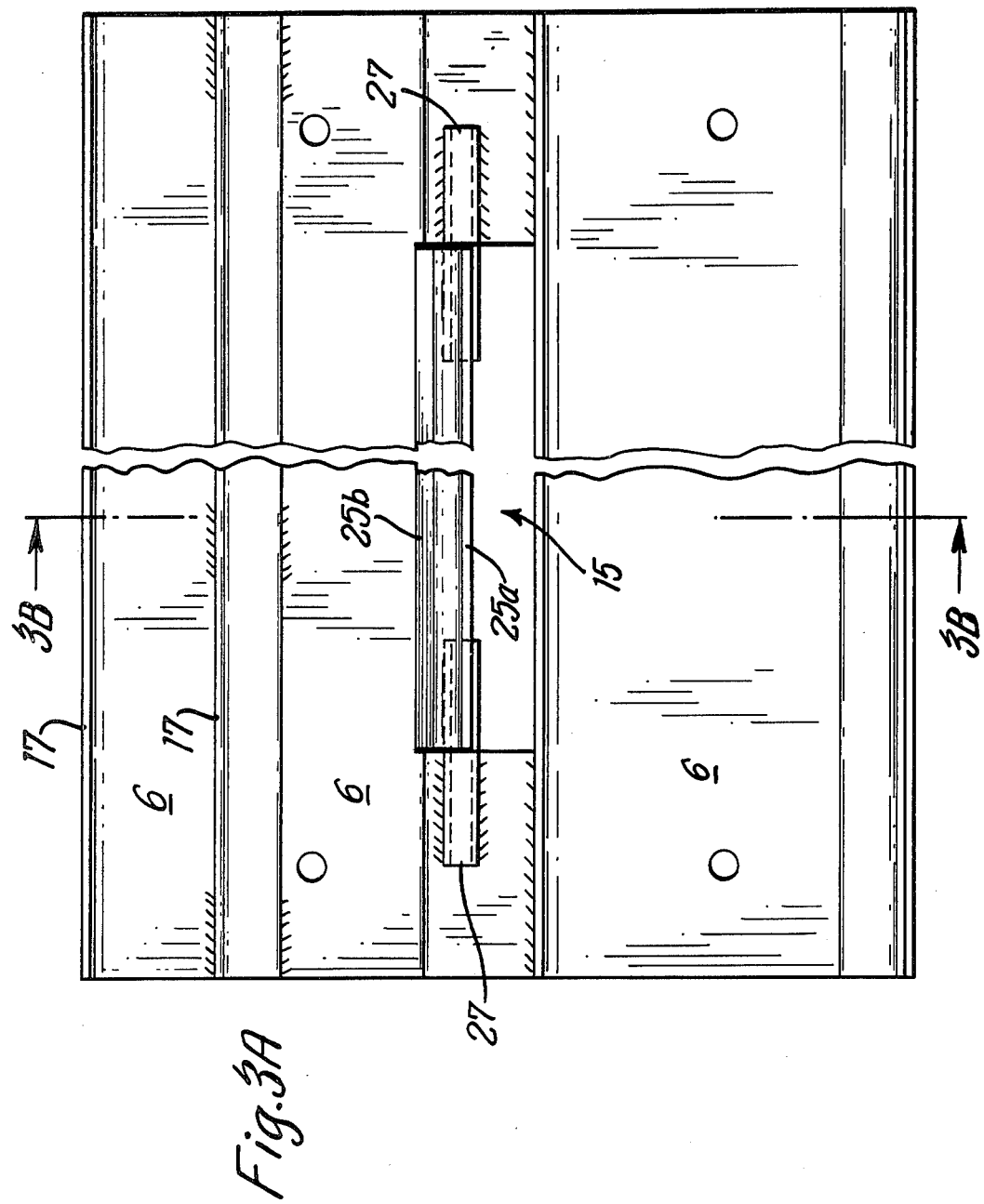

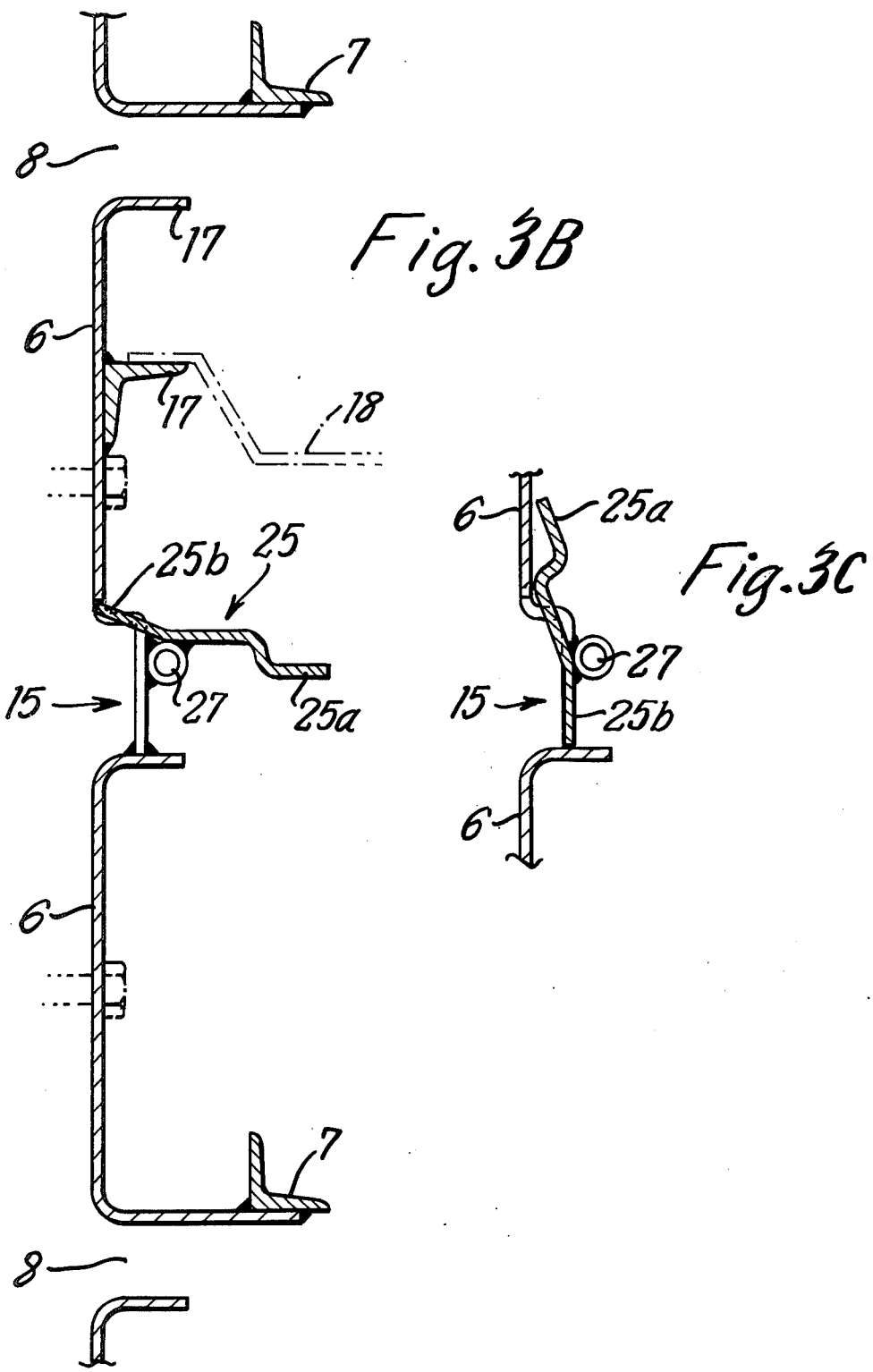

OVENS FOR BAKING BREAD AND LIKE PRODUCTS

BACKGROUND OF THE INVENTION

This invention relates to ovens for baking bread and like products, and more particularly to ovens of the forced air convection type in which heated air is used to supply the heat for baking the products.

A problem arises over the efficient usage of such ovens when a manufacturer is producing products of different sizes, because a much greater spacing of the trays in the oven is necessary when a product such as bread is being baked compared with the spacing necessary to produce comparatively small products such as rolls.

It is an object of one aspect of the present invention to provide an oven which is readily convertible for use in either the baking of bread or the baking of small products such as rolls.

SUMMARY OF THE INVENTION

In accordance with the present invention there is provided an oven for baking bread and like products, which comprises an oven chamber, a hollow roof over the chamber, hollow walls at the sides of the chamber, bracket means secured to the side walls of the chamber and each including a horizontal part for supporting trays carrying portions of dough mixture for baking to form bread, means for circulating air from the chamber through the hollow roof and the hollow side walls and back into the chamber through horizontal slits in the side walls of the chamber, there being a first series of horizontal slits, which are located so that there is a slit beneath the horizontal part of each bracket means, and a second series of horizontal slits, slits in the second series alternating with slits in the first series, means for heating the air during such circulation, and means pivotably mounted adjacent a respective horizontal slit in the second series such that the pivotably mounted means may be moved between a first position in which the adjacent slit in the second series is closed and a second position in which the adjacent slit in the second series is open and a horizontal support is provided for one end of a tray carrying portions of dough mixture for baking into small articles such as rolls.

In one embodiment of the present invention each pivotably mounted means is pivotably mounted to the side walls above the said adjacent slit and the pivotably mounted means comprises a single member which has a lower portion which extends through the said adjacent slit at all times and which is adapted, when the member is in the first position, to engage a portion of the side wall which defines the said adjacent slit over an area which is immediately below the said adjacent slit and which is on the side of the wall remote from the oven chamber.

In a second embodiment of the present invention each pivotably mounted means comprises a member mounted to pivot about a pivot axis disposed at a height intermediate the upper and lower edges of the adjacent slit in the second series, and wherein the member includes a portion which, in the said first position, closes the portion of the adjacent slit extending between the pivot axis and the lower edge of the said adjacent slit, and in the said second position closes the portion of the slit extending between the pivot and the upper edge of the said adjacent slit.

Currently bread products which are desired to have a substantially rectangular shape are made by baking the dough mixture in a tin over which there is a cover having that shape. However, the placing of a shaped cover over each tin in which a loaf is to be baked, and the subsequent removal of each cover individually is a time-consuming operation which adversely affects the production rate.

According to a second aspect of the present invention, it is proposed that an oven for baking bread shall include an oven chamber having side walls including means supporting trays for carrying dough portions for baking to form loaves of bread, and members removably supported by the side walls of the oven, the members each including a horizontal portion for restricting the rise of the dough portions on a tray during baking such that the dough portions are baked to form loaves of generally rectangular shape.

In the oven according to this second aspect of the present invention the tray carrying the baked loaves of generally rectangular shape is removable from the oven and may be replaced by a tray carrying further dough portions for baking to form further loaves of generally rectangular shape without the necessity for moving the member which includes the horizontal portion which is effective in causing the loaves to have the generally rectangular shape. However, when it is desired to use the oven to bake loaves of bread of a natural shape, rather than the generally rectangular shape, the members which include the horizontal portions are removable from the oven.

Advantageously the side walls of the oven carry respective pairs of flanges defining grooves or slideways within which each of the members may be supported in the oven for forming the loaves of generally rectangular shape.

BRIEF DESCRIPTION OF THE DRAWINGS

In the drawings:

FIG. 1 is a diagrammatic sectional front view of a portion of an oven incorporating the present invention, FIG. 2 is an enlarged view showing details from the opposed side walls of the oven, FIG. 3A is a view of a portion of the side wall of an oven seen from within the chamber of an oven similar to the oven of FIG. 1, but incorporating a modified pivotably mounted member, FIG. 3B is a sectional view of the side wall of FIG. 3A taken along the line B—B, FIG. 3C is a sectional view of a portion of the side wall similar to FIG. 3B but showing the pivotably mounted member in the closed position.

In the drawings the same or similar parts are designated by like reference numerals.

DETAILED DESCRIPTION

Figure 4A:
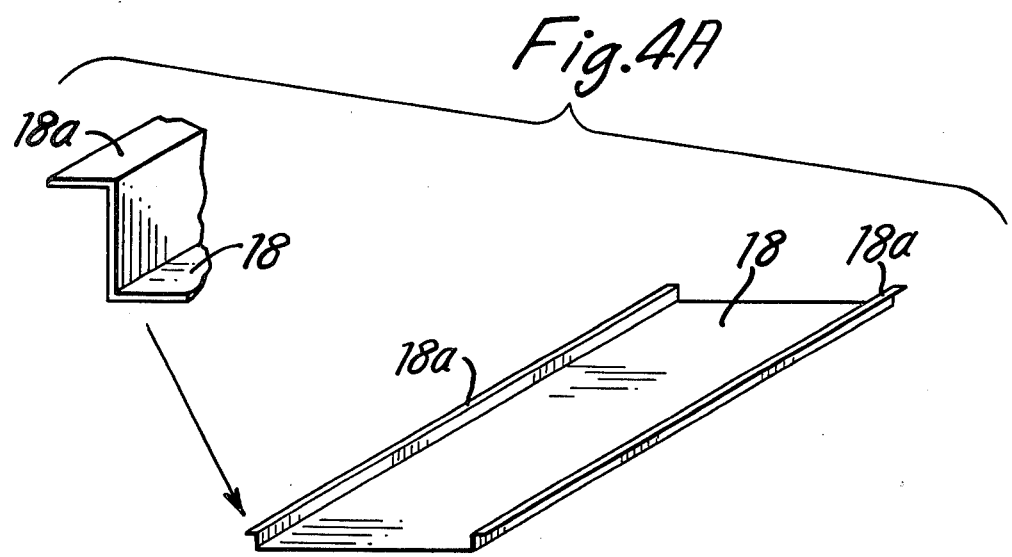
FIG. 4A shows a perspective view of one of the members used for forming loaves of generally rectangular shape.

Referring to FIG. 1 there is shown a part of an oven which includes hollow side walls 1 and 2 each of which consists of an insulating portion 3 and an inner cavity part 4 which is separated from an oven chamber 5 by a vertical member 6. The vertical member 6 which is part of each of the side walls 1 and 2 is formed with inwardly projecting flanges 7 each of which is located immediately above a horizontal slit 8 in the vertical member 6.

The oven has an insulating floor (not shown) and a roof which includes an insulating part 9 and a horizontal member 10 which, with the lower wall of the insulating part 9, defines a cavity 11 separated from the oven chamber 5 by the horizontal member 10. The cavity 11 is joined with the cavities in the side walls 1 and 2, and also communicates with the oven chamber 5 through a central aperture 12 which includes a fan 13 for withdrawing air from the oven chamber 5 through the aperture 12 and a central member 12a which is hollow and apertured. The air which is withdrawn from the oven chamber 5 is caused to be circulated through the cavity 11 and into the hollow side walls 1 and 2 where there is a substantial pressure build-up causing the air to be ejected into the oven chamber 5 through the horizontal slits 8, which constitute a first series of slits in the side walls 1 and 2 of the oven chamber 5.

During the circulation of the air from the oven chamber 5 into the cavity 11 and through the hollow side walls 1 and 2, the air is heated in a known manner (for example by electrical heating means 14) so as to maintain the oven chamber 5 at the desired temperature for baking dough mixture.

Intermediate each flange 7 and the horizontal slit 8 above that flange, the vertical members 6 of the side walls 1 and 2 contain further horizontal slits 15, which together constitute a second series of horizontal slits in the side walls 1 and 2. Pivotally mounted immediately above each horizontal slit 15 is a swivel bracket 16 which in the position shown in FIG. 1 is capable of supporting additional trays whereby the oven may be efficiently employed in the manufacture of small bakery products such as rolls.

In the manufacture of such small bakery products in the oven chamber 5 there will be a tray carrying tins of dough mixture supported by each of the opposed flanges 7 and also each of the swivel brackets 16. An even distribution of heat to the tins of dough mixture carried by all the trays when the oven is operated in this manner is ensured by the supply of heated air through both the first series of horizontal slits 8 and the second series of horizontal slits 15 in the vertical members 6 which constitute the inner faces of the side walls 1 and 2.

When the oven is to be converted for use in baking large products such as loaves of bread, the swivel brackets 16 are moved about their hinges 16a to the position shown in FIG. 2 in which the S-shaped lower portion of each swivel bracket 16 engages the outer surface of the adjacent area of the vertical member 6 and closes the associated horizontal slit 15 so that this is sealed and the entry of hot air through the slit 15 is prevented. The supply of heat to the dough mixture which is being baked to form loaves of bread thus occurs solely through the first series of horizontal slits 8 so that the dough mixture is evenly heated and there is no direct application of heated air to the loaf as it is formed from the dough mixture in the oven chamber 5.

Therefore the second series of horizontal slits 15 may be selectively open or closed, depending on whether the products being baked are small or large, and the first series of horizontal slits 8 are always open.

Referring now to FIGS. 3A, 3B and 3C there is shown a portion of a vertical member 6 of a side wall of an oven essentially similar to the oven of FIG. 1 but having modified swivel brackets 25, one of which is shown in each of FIGS. 3A, 3B and 3C. The swivel bracket 25 is a member having a longer portion 25a and a shorter portion 25b extending in opposite directions from the pivot axis of the hinges 27. In the position shown in FIG. 3B, the longer portion 25a of the swivel bracket 25 extends within the oven chamber to provide a support for a tray carrying portions of dough mixture for baking, and the shorter portion 25b of the swivel bracket 25 effectively closes the portion of the horizontal slit 15 extending between the pivot axis and the upper edge of the horizontal slit 15.

Referring to FIG. 3C the swivel bracket 25 is shown in the alternative position in which the longer portion 25a is adjacent the interior surface of the vertical member 6 of the side wall thereby closing the portion of the horizontal slit 15 extending between the pivot axis and the upper edge of the horizontal slit 15, while the portion 25b of the swivel bracket 25 closes the portion of the horizontal slit 15 extending between the pivot axis and the lower edge of the horizontal slit 15. In this position of the swivel bracket 25, the horizontal slit 15 is entirely closed. Because the areas of the portions 25a and 25b of the swivel bracket 25 which are exposed to the pressure difference existing between the cavity part 4 of the side wall and the oven chamber 5 are similar, there is no effective turning force acting to rotate the swivel bracket 25 about the pivot axis and no means for retaining the swivel bracket 25 in the position of FIG. 3C need be provided.

The embodiment of the invention illustrated in FIGS. 3A, 3B and 3C has the advantage over the embodiment of FIGS. 1 and 2, in that the swivel bracket 25 is so shaped and arranged as to provide less disturbance to the flow of air within the side walls 1 and 2 than is caused by the swivel bracket 16 in the position shown in FIG. 1.

Figure 4B:
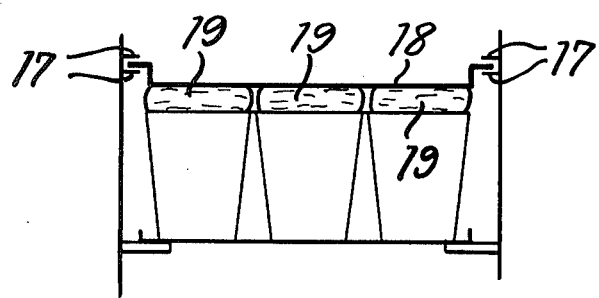
FIG. 4B shows the member of FIG. 4A in operation to form such loaves.

Referring to FIGS. 1 and 4 there are also shown on the side walls of the oven, pairs of flanges 17 into which there may be inserted the lips 18a of member 18 which are thus supported by the flanges 17. Each member 18 presents a substantially horizontal surface over the top of all the tins carrying dough mixture for baking into loaves on a tray supported by the flanges 7. FIG. 4A shows a perspective view of such a member 18 and FIG. 4B shows the member 18 in position in the oven and operative to check the rising of the dough mixture 19 during the formation of the loaves so that the loaves are formed with their upper surfaces flat and the loaves are generally rectangular in shape.

Figure 5A:
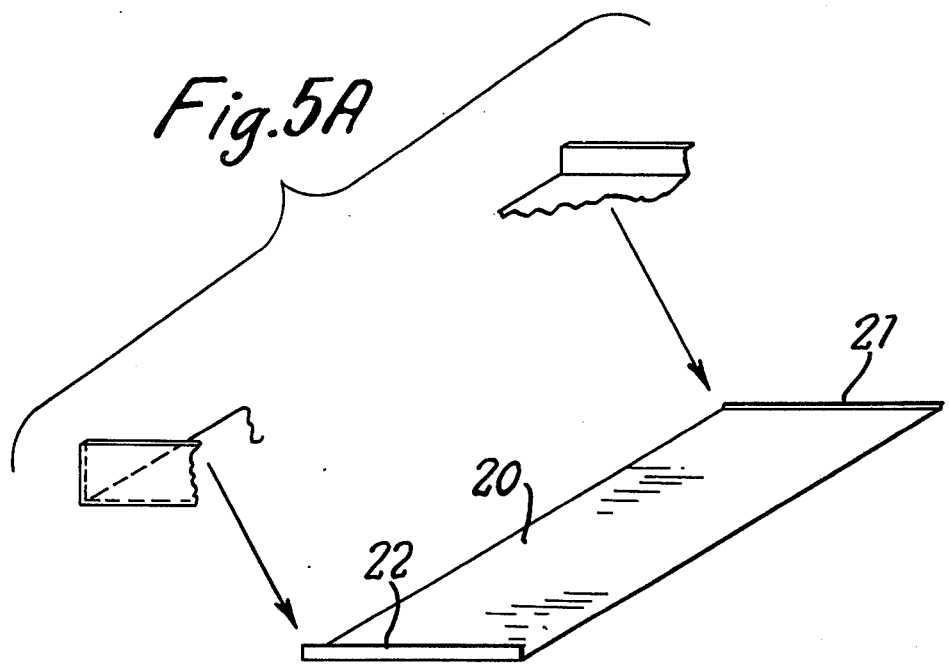
FIGS. 5A and 5B are respectively a perspective view and a side view of a tray for supporting tins containing dough mixture to be baked.
Figure 5B:
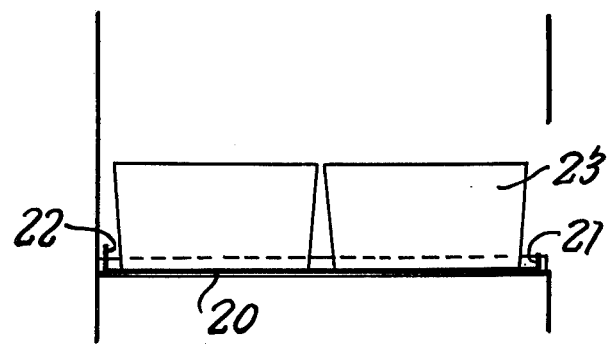

In FIGS. 5A and 5B there are shown respectively perspective and side views of a preferred form of tray 20. The tray 20 is formed with front and rear lips 21 and 22 of which the rear lip 22 is sufficiently high (of the order of 1 inch) to ensure that the tins do not become displaced off the tray 20 as this is withdrawn from the oven, and the front lip 21 is a much lower lip (of the order of ¼ inch in height) which provides sufficient purchase to enable the operator to draw the tray 20 forward easily by pulling on the front lip 21. However, the front lip 21 is not high enough to provide any substantial barrier to the removal of tins 23 from the tray.

According to another feature of the present invention, a tray such as the tray 20 is placed in the oven on the flanges 7 even when the tray is not carrying tins of dough mixture for baking. The presence of a tray on each pair of flanges 7 in the oven chamber 5 ensures the desired flow of heated air horizontally across the oven from each of the horizontal slits 8 so that an even distribution of temperature throughout the oven chamber 5 is maintained.

I claim:

1. An oven for baking bread and like products, which comprises an oven chamber, a hollow roof over the chamber, hollow walls at the sides of the chamber, bracket means secured to the side walls of the chamber and each including a horizontal part for supporting trays carrying portions of dough mixture for baking to form bread, means for circulating air from the chamber through the hollow roof and the hollow side walls and back into the chamber through horizontal slits in the side walls of the chamber, there being a first series of horizontal slits, which are located so that there is a slit beneath the horizontal part of each bracket means, and a second series of horizontal slits, slits in the second series alternating with slits in the first series, means for heating the air during such circulation, and means pivotably mounted adjacent a respective horizontal slit in the second series such that the pivotably mounted means may be moved between a first position in which the adjacent slit in the second series is closed and a second position in which the adjacent slit in the second series is open and a horizontal support is provided for one end of a tray carrying portions of dough mixture for baking into small articles such as rolls.

2. An oven according to claim 1 wherein each pivotably mounted means is pivotably mounted to the side walls above the said adjacent slit and the pivotably mounted means comprises a single member which has a lower portion which extends through the said adjacent slit at all times and which is adapted, when the member is in the first position, to engage a portion of the side wall which defines the said adjacent slit over an area which is immediately below the said adjacent slit and which is on the side of the wall remote from the oven chamber.

3. An oven according to claim 1 wherein each pivotably mounted means comprises a member mounted to pivot about a pivot axis disposed at a height intermediate the upper and lower edges of the adjacent slit in the second series, and wherein the member includes a portion which, in the said first position, closes the portion of the adjacent slit extending between the pivot axis and the lower edge of the said adjacent slit, and in the said second position closes the portion of the slit extending between the pivot and the upper edge of the said adjacent slit.

* * * * *